(12) United States Patent
Al-Duwaish et al.

(10) Patent No.: US 8,595,162 B2
(45) Date of Patent: Nov. 26, 2013

(54) ROBUST CONTROLLER FOR NONLINEAR MIMO SYSTEMS

(75) Inventors: Hussain Al-Duwaish, Dhahran (SA); Syed Zeeshan Rizvi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 275 days.

(21) Appl. No.: 13/215,097

(22) Filed: Aug. 22, 2011

(65) Prior Publication Data
US 2013/0054500 A1    Feb. 28, 2013

(51) Int. Cl.
G06E 1/00 (2006.01)
G06E 3/00 (2006.01)
G06F 15/18 (2006.01)
G06G 7/00 (2006.01)

(52) U.S. Cl.
USPC ............................................................ 706/19

(58) Field of Classification Search
None
See application file for complete search history.

(56) References Cited

U.S. PATENT DOCUMENTS

| | | | |
|---|---|---|---|
| 6,064,997 A * | 5/2000 | Jagannathan et al. | 706/23 |
| 6,904,422 B2 * | 6/2005 | Calise et al. | 706/23 |
| 7,418,432 B2 * | 8/2008 | Calise et al. | 706/23 |
| 7,577,626 B1 | 8/2009 | Mountrakis | |
| 8,065,022 B2 * | 11/2011 | Minto et al. | 700/29 |

OTHER PUBLICATIONS

Automatic Generation Control of Interconnected Power System Using Ann Technique Based on μ Synthesis, Hossein Shayeghi, Heidar Ali Shayanfar, Journal of Electrical Engineering, Vol. 55, No. 11-12, 2004, 306-313.

* cited by examiner

*Primary Examiner* — Kakali Chaki
*Assistant Examiner* — Luis Sitiriche
(74) *Attorney, Agent, or Firm* — Richard C. Litman

(57) ABSTRACT

The robust controller for nonlinear MIMO systems uses a radial basis function (RBF) neural network to generate optimal control signals abiding by constraints, if any, on the control signal or on the system output. The weights of the neural network are trained in the negative direction of the gradient of output squared error. Nonlinearities in the system, as well as variations in system parameters, are handled by the robust controller. Simulation results are included in the end to assess the performance of the proposed controller.

11 Claims, 16 Drawing Sheets ent invention relates to controllers for electronic
ROBUST CONTROLLER FOR NONLINEAR MIMO SYSTEMS

BACKGROUND OF THE INVENTION

1. Field of the Invention

The present invention relates to controllers for electronic control systems, and particularly to a robust controller for nonlinear MIMO (multiple-input, multiple output) systems.

2. Description of the Related Art

Nonlinear control has been a subject of immense interest among researchers. Almost every real life process has nonlinear behavior. At the same time, systems in real life are prone to change in parameters due to several internal and external factors affecting the process. Hence, robust controller design for nonlinear systems has become a vital requirement in modern control theory and practice. The nonlinearity in systems is most often beyond the limit of linear controllers. This has caused many nonlinear control techniques to surface over the past two decades, such as nonlinear PID (proportional-integral-derivative) control.

In particular, feedback linearization techniques have drawn much interest recently. The basic idea of feedback linearization is to transform the nonlinear system into a linear system so that linear control techniques can be applied easily. However, this requires exact knowledge of plant nonlinearities, thereby making the performance of feedback linearization limited, as well as conditional. Adaptive control techniques surfaced in order to reduce the dependency on an exact model. However, several adaptive control techniques require a reference model or system identification of the plant as the plant is running. Another notable nonlinear control technique known as sliding mode control (SMC) stems from an extension of PID control. SMC alters the dynamics of a nonlinear system by applying high-frequency switching control. It switches from one continuous structure to another based on the current position in the state-space. However, due to the hard sliding mode control action, SMC has to be applied with more care than other nonlinear control techniques in order to avoid energy loss and damage to plants.

On the other hand, among several techniques that have surfaced in the recent past to cater to the challenging problem of nonlinear control, artificial neural networks (ANN) have emerged as an efficient class of machines capable of learning complex nonlinear functions. The use of neural networks in controller design is therefore a natural choice. Neural networks have been used for pattern recognition, function approximation, time-series prediction, and classification problems for quite some time. The ability of neural networks to map complex input-output relationships make them ideal for compensating plant nonlinearities, and hence make them ideal for controller design problem.

Several techniques involving neural networks have surfaced in the past decade for nonlinear adaptive control. However, in many adaptive control approaches, it is well understood that there exists a necessary assumption that the controlled system has to be a minimum-phase system, i.e., the zero dynamics of the system must be stable. Several nonlinear adaptive control techniques known in the art have based their controller on this assumption. Many other nonlinear controllers known in the art require state-feedback. While state-feedback poses no harm to controller performance, it requires state measurement at every sampling time using sensors, which can increase the implementation cost if the system has a significant number of states. As compared to state-feedback, an output-feedback scheme can be less expensive, due to the fact that controlled outputs are a smaller subset of system states, in most cases. Such controllers also require a process model derived from mass and energy balance equations, thus requiring a rigorous model. An adaptive neural network control scheme for systems containing non-smooth nonlinearities in the actuator device has also been proposed. Such a control scheme is limited to single-input single-output (SISO) systems.

Thus, a robust controller for nonlinear MIMO systems solving the aforementioned problems is desired.

SUMMARY OF THE INVENTION

The robust controller for nonlinear MIMO systems uses a radial basis function (RBF) neural network to generate optimal control signals abiding by constraints, if any, on the control signal or on the system output. The weights of the neural network are trained in the negative direction of the gradient of the output's squared error. Nonlinearities in the system, as well as variations in system parameters, are catered to by the controller. Simulation results are included in the end to assess the performance of the proposed controller.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
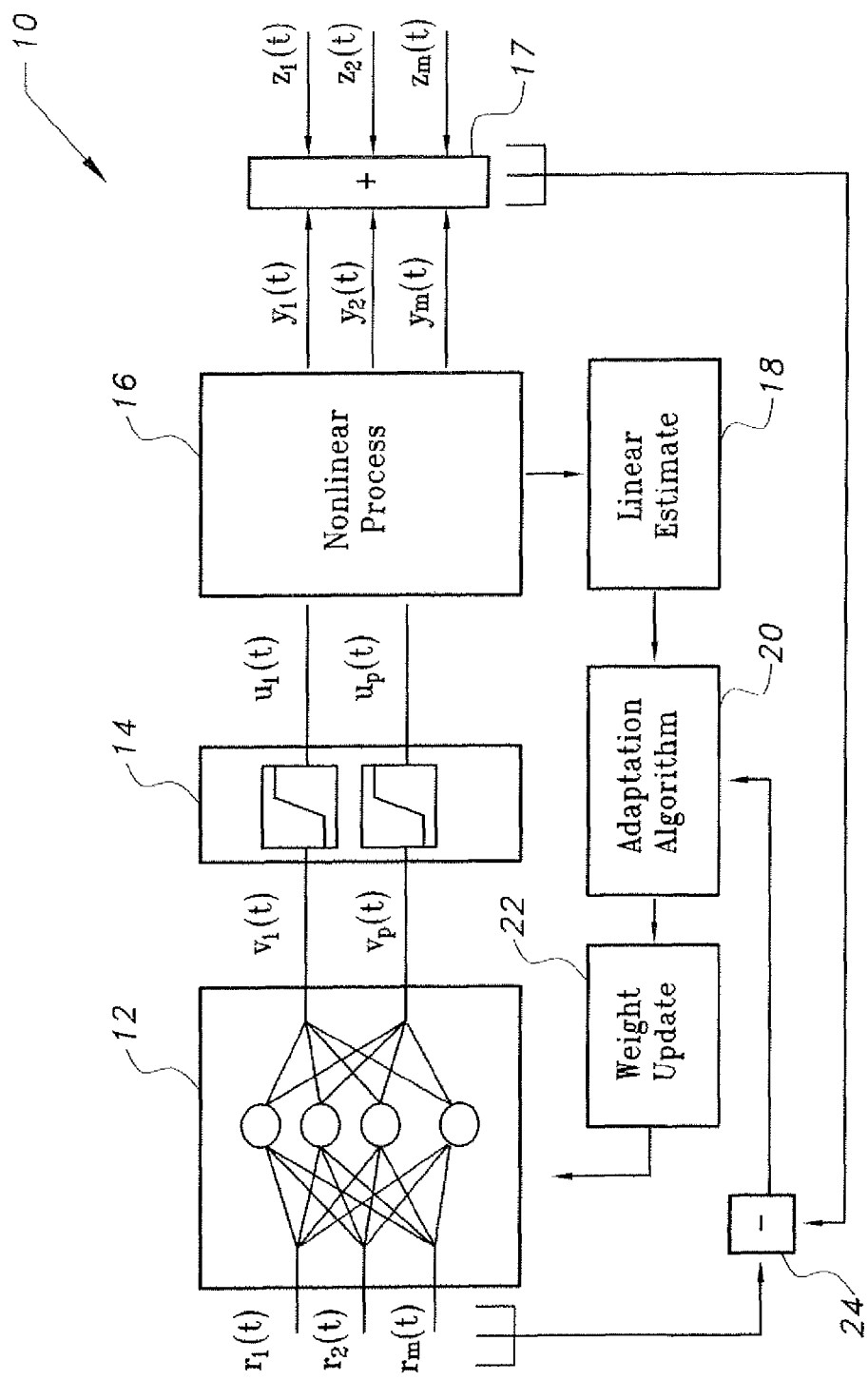
FIG. 1 is a block diagram of a robust controller according to the present invention.
Figure 2:
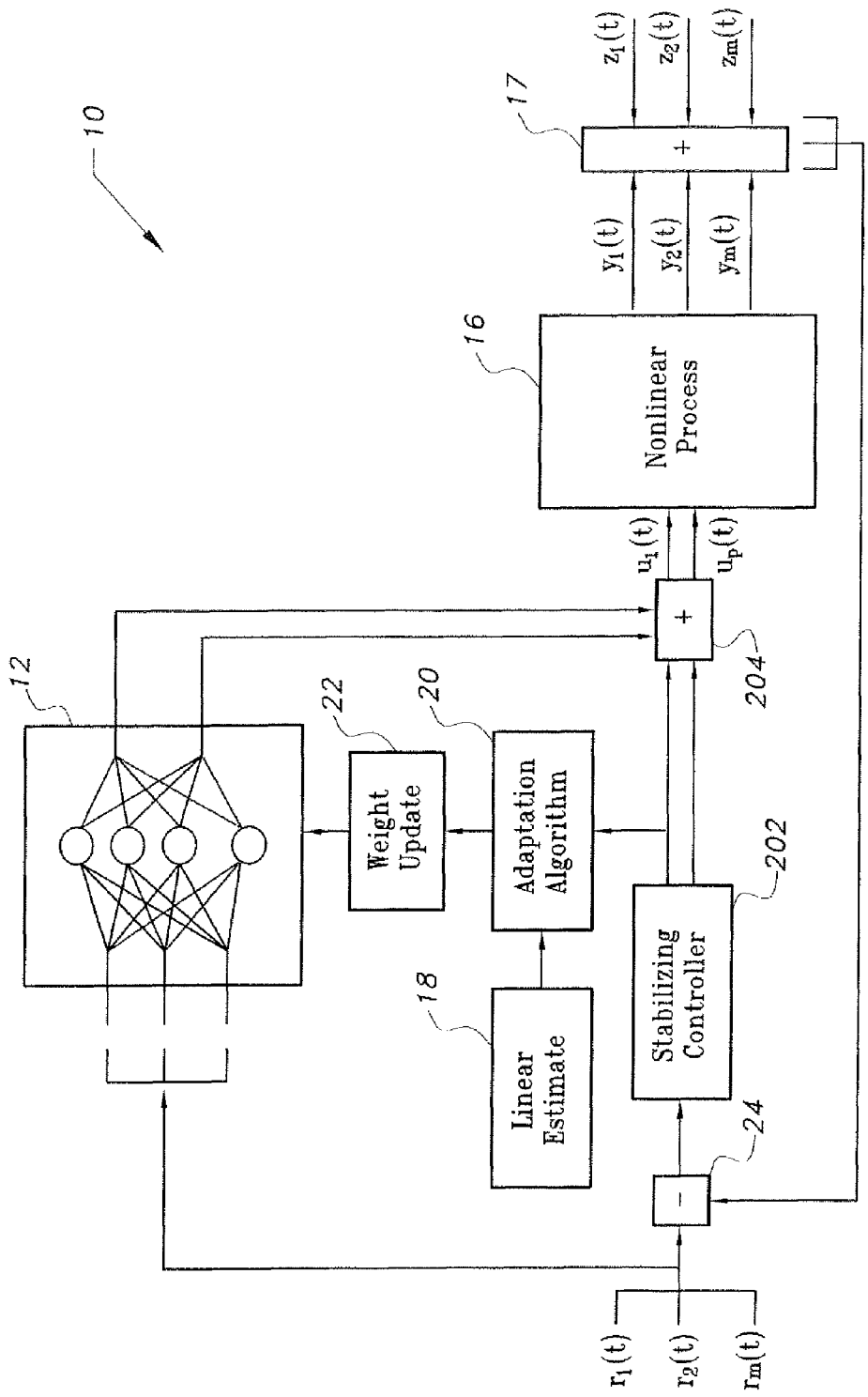
FIG. 2 is a block diagram of a robust controller according to the present invention, also having a stabilizing controller.

As shown in FIGS. 1 and 2, the robust controller for nonlinear multiple-input, multiple-output (MIMO) systems 10 uses a radial basis function (RBF) neural network 12 to generate optimal control signals abiding by constraints, if any, on the control signal or on the system output. The weights of the neural network are trained in the negative direction of the gradient of the output's squared error. Nonlinearities in the system, as well as variations in system parameters, are catered to by the controller 10. Simulation results are included to assess the performance of the controller 10.

It will be understood that the diagrams in the Figures depicting the robust controller for nonlinear MIMO systems are exemplary only, and may be embodied in a dedicated electronic device having a microprocessor, microcontroller, digital signal processor, application specific integrated circuit, field programmable gate array, any combination of the aforementioned devices, or other device that combines the functionality of the robust controller for nonlinear MIMO systems onto a single chip or multiple chips programmed to carry out the functions described herein, or may be embodied in a general purpose computer having the appropriate peripherals attached thereto and software stored on a computer readable media that can be loaded into main memory and executed by a processing unit to carry out the functionality of the apparatus, including any steps of the method described herein.

The Radial Basis Function (RBF) network-based controller 10 provides control signals for nonlinear multi-input multi-output (MIMO) systems. The RBF network 12 is used as a controller in order to compensate for system nonlinearities. A unique weight update equation is derived. The derived weight update law takes into consideration any constraints on the control signal or on the system output. The control scheme shown in FIG. 1 utilizes a RBF neural network 12, which accepts reference trajectory control inputs $r_1(t), r_2(t) \ldots r_m(t)$ for a nonlinear process. The RBF neural network 12 will produce an unconstrained output, $v_1(t), v_2(t)$ responsive to the nonlinear process control inputs. A tangent-sigmoid activation function generator 14 transforms the RBF output into constrained control outputs $u_1(t), u_p(t)$ acceptable by the nonlinear process 16.

A summer 17 accepts high fidelity outputs $y_1(t), y_2(t) \ldots y_m(t)$ and noisy outputs $z_1(t), z_2(t) \ldots z_m(t)$ of the nonlinear process. The computed sum is routed to a difference calculator 24, which performs a difference calculation between the reference trajectories and their corresponding noisy system outputs. The result of the difference calculation is provided as an input to an adaptation algorithm processor 20. A linear estimator 18 outputs a linear estimation signal to the adaptation algorithm processor 18. The linear estimate is based on information that the linear estimator 18 receives from the nonlinear process 16. Obtaining the linear estimate is a one-time procedure and is estimated before the start of online control using the methods of system identification. The adaptation algorithm processor 20 calculates the adaptation based on the inputs provided by the difference calculator 24 and the linear estimator 18. A weight updater 22 calculates updated weights based on the output of the adaptation algorithm processor 20, and transmits the updated weights to the RBF network 12.

The control scheme shown in FIG. 2 modifies the configuration shown in FIG. 1 by adding a stabilizing-controller 202, which specifically addresses unstable systems.

The controller 10 does not require knowledge of the actual states of the system, and hence does not depend on the knowledge of a rigorous model. The controller 10 only requires an initial linear time-invariant (LTI) estimate of the plant obtained by offline identification. Due to strong adaptation capabilities of the RBF network 12, an update in model estimate is not required, unlike most adaptive control methods.

The derived update law shows strong learning, and hence strong compensation of plant nonlinearities by the RBF network. Comparison with Model Reference Adaptive Control (MRAC) based on the neural network shows a sharp reduction in computation complexity.

While most inverse-model-based linear controllers and most adaptive control techniques require the condition of minimum-phase characteristic on the plant, the present controller 10 relaxes this condition, since the RBF network 12 only takes an estimate of the zero dynamics of the plant. Moreover, the present controller 10 utilizes a feedback signal of only the controlled outputs, rather than all the states, thereby reducing implementation cost.

Consider a nonlinear time-varying discrete-time process having p inputs and m outputs:

$$x(k+1) = f(x(k), k) + g(u(k), k)$$

$$y(k) = h(x(k), k) \qquad (1)$$

It is required that the process outputs follow a desired set of reference points $r(k)=[r_1(k) \ldots r_m(k)]^T$. The process is approximated using a linear time-invariant (LTI) model. This can be achieved in terms of initial offline identification.

$$x(k+1)=Ax(k)+Bu(k)$$

$$y(k)=Cx(k)+Du(k) \qquad (2)$$

In a case where the controlled plant is unstable, care has to be taken to initialize the control scheme with a stabilizing controller, and then allow the neural network to take over, since a neural network initialization with random weights will render the system unstable. FIG. 2 shows the novel control scheme with stabilizing controller 202. In such a scheme, the input to the plant is the sum of the feedback control signal and the output of the RBF controller which is computed by summer 204. The error signal of FIG. 1 is replaced by the feedback control signal in FIG. 2 in order to update the RBF weights, while the desired reference is used as input to the RBF network. The stabilizing controller 202 can be applied in the form of a proportional controller with gain. Since the gain of the proportional controller is kept fixed, the error signal and the feedback control signal can be used interchangeably, thereby allowing derivation of the same control law for both schemes. This approach ensures that the initialization is stable. The RBF network weights can simply be initialized at zero. FIG. 2 shows that the controller under such a condition is a standard industrial controller. Gains for the available industrial controllers are normally selected such that the overall system is stable in a limited operating region. The closed-loop system therefore remains stable if the allowable initial conditions are selected within this operating region and until the neural network begins to learn. As the training proceeds, the feedback control signal will reduce and the RBF network will take over from the stabilizing controller. Once taken over, the RBF network, with its robustness and adaptability, will provide better control than the fixed stabilizing controller alone.

Having ensured a stable initialization, the control law can be derived as follows. The controller comprises an RBF nerual network. The $j^{th}$ output of the RBF network is given by:

$$v_j(k)=w_j^T \phi(k), \qquad (3)$$

where $w_j$ is the vector for weights of $j^{th}$ RBF output, given by:

$$w_j=[w_{1j} \ldots w_{qj}]^T, \qquad (4)$$

and $\phi(k)$ is the basis function vector, which is given by:

$$\phi(k)=[\phi(\|H(k)-c_1\|) \ldots \phi(\|H(k)-c_q\|)]^T \qquad (5)$$

In the above equations, q denotes the number of neurons in the hidden layer, $c_i \in \Re^m$ is the center for the $i^{th}$ neuron of that layer, $\phi$ is the radial basis function, and $\|\cdot\|$ denotes norm. For $j=1, 2, \ldots p$, the constraints on any control signal $u_j(k)$ are given by:

$$u_{min} \leq u_j(k) \leq u_{max},$$

$$\Delta u_{min} \leq \Delta u_j(k) \leq \Delta u_{max}. \qquad (6)$$

To meet this constraint, the output of the RBF network is transformed by a tangent-sigmoid activation function forming the constrained control signal:

$$u_j(k) = \alpha \frac{e^{\beta v_j(k)}-1}{e^{\beta v_j(k)}+1} = \alpha \frac{e^{\beta w_j^T \phi(k)}-1}{e^{\beta w_j^T \phi(k)}+1}$$

where $\alpha=|u_{min}|=|u_{max}|$ denotes the upper and lower limits of the constraints and $\beta$ is used to adjust the slope of the linear part of tangent-sigmoid function.

The difference between the reference trajectory $r(k)$ and the process output $y(k)$ gives the error $e(k)=[e_1(k) \ldots e_m(k)]^T$. In order to update the controller, the weights of the RBF network are trained in the negative direction of the derivative of cost function I, which is given by:

$$I=e^T(k)e(k), \qquad (7)$$

The weight update equation for $j^{th}$ control signal $u_j(k)$ is given as:

$$w_j(k+1) = w_j(k) - \eta \frac{\partial I}{\partial w_j}. \qquad (8)$$

Now finding the partial derivative of I w.r.t $w_j$:

$$\frac{\partial I}{\partial w_j} = 2e^T(k)\frac{\partial}{\partial w_j}e(k)$$

$$= 2e^T(k)\frac{\partial}{\partial w_j}(r(k)-y(k))$$

$$\frac{\partial I}{\partial w_j} = -2e^T(k)\frac{\partial}{\partial w_j}y(k)$$

$$= -2e^T(k)\frac{\partial}{\partial w_j}[\hat{y}_1(k) \ldots \hat{y}_r(k)]^T.$$

Since $y(k)$ is the output of the state-space model, the above equation can be re-written as:

$$\frac{\partial I}{\partial w_j} = -2e^T(k)\frac{\partial}{\partial w_j}(Cx(k)+Du(k)),$$

which can be written as:

$$\frac{\partial I}{\partial w_j} = -2e^T(k)\frac{\partial}{\partial w_j}(C\{Ax(k-1)+Bu(k-1)\}+Du(k)).$$

The terms independent of $w_j$ would vanish, since $x(k-1)$ depends on $u(k-2)$, which, in turn, is a function of w. The dependence of state vector $x(k-1)$ on the weights w of the neural network is acknowledged. However, the term for the derivative of $CAx(k-1)$ w.r.t w is deliberately neglected, since expansion of $x(k)$ into past state terms $Ax(k-n)+Bu(k-n)$ for $n \geq 2$ does:

$$\frac{\partial I}{\partial w_j} = -2e^T(k)\left(\frac{\partial CBu(k-1)}{\partial w_j} + \frac{\partial Du(k)}{\partial w_j}\right). \qquad (9)$$

Finding the derivative of tangent-sigmoid function:

$$\frac{\partial u_j(k)}{\partial w_j} = \alpha \frac{\partial}{\partial w_j} \frac{e^{\beta w_j^T \phi(k)}-1}{e^{\beta w_j^T \phi(k)}+1} \qquad (10)$$

-continued $$= \alpha \frac{2\beta\phi(k)e^{\beta w_j^T \phi(k)}}{\left(e^{\beta w_j^T \phi(k)} + 1\right)^2}.$$

Equation (9) can now be written as $$\frac{\partial I}{\partial w_j} = -2e^T(k)\left(\frac{CB\partial u(k-1)}{\partial w_j} + \frac{D\partial u(k)}{\partial w_j}\right).$$

Let the product of $C \in \mathfrak{R}^{m \times n}$ and $B \in \mathfrak{R}^{n \times p}$ be $\Psi \in \mathfrak{R}^{m \times p}$. Then:

$$\frac{\partial I}{\partial w_j} = -2e^T(k)$$

$$\left(\begin{bmatrix} \psi_{11} & \cdots & \psi_{1p} \\ \vdots & \ddots & \vdots \\ \psi_{m1} & \cdots & \psi_{mp} \end{bmatrix} \begin{bmatrix} \frac{\partial}{\partial w_j}u_1(k-1) \\ \vdots \\ \frac{\partial}{\partial w_j}u_p(k-1) \end{bmatrix} + \begin{bmatrix} d_{11} & \cdots & d_{1p} \\ \vdots & \ddots & \vdots \\ d_{m1} & \cdots & d_{mp} \end{bmatrix} \begin{bmatrix} \frac{\partial}{\partial w_j}u_1(k) \\ \vdots \\ \frac{\partial}{\partial w_j}u_p(k) \end{bmatrix}\right).$$

The derivative of all terms except $u_j(k-1)$ and $u_j(k)$ would vanish. Substituting $$\frac{\partial u_j(k)}{\partial w_j}$$

from the derivative equation:

$$\frac{\partial I}{\partial w_j} = -2e^T(k)\left(\begin{bmatrix} \psi_{1j}\frac{\partial}{\partial w_j}u_j(k-1) \\ \vdots \\ \psi_{mj}\frac{\partial}{\partial w_j}u_j(k-1) \end{bmatrix} + \begin{bmatrix} d_{1j}\frac{\partial}{\partial w_j}u_1(k) \\ \vdots \\ d_{mj}\frac{\partial}{\partial w_j}u_1(k) \end{bmatrix}\right) = -2e^T(k)$$

$$\left(\begin{bmatrix} \psi_{1j}\alpha\frac{2\beta\phi(k-1)e^{\beta w_j^T\phi(k-1)}}{\left(e^{\beta w_j^T\phi(k-1)}+1\right)^2} \\ \vdots \\ \psi_{mj}\alpha\frac{2\beta\phi(k-1)e^{\beta w_j^T\phi(k-1)}}{\left(e^{\beta w_j^T\phi(k-1)}+1\right)^2} \end{bmatrix} + \begin{bmatrix} d_{1j}\alpha\frac{2\beta\phi(k)e^{\beta w_j^T\phi(k)}}{\left(e^{\beta w_j^T\phi(k)}+1\right)^2} \\ \vdots \\ d_{mj}\alpha\frac{2\beta\phi(k)e^{\beta w_j^T\phi(k)}}{\left(e^{\beta w_j^T\phi(k)}+1\right)^2} \end{bmatrix}\right).$$

$$\frac{\partial I}{\partial w_j} = -2[e_1(k) \ \ldots \ e_m(k)]$$

$$\begin{bmatrix} \psi_{1j}\alpha\frac{2\beta\phi(k-1)e^{\beta w_j^T\phi(k-1)}}{\left(e^{\beta w_j^T\phi(k-1)}+1\right)^2} + d_{1j}\alpha\frac{2\beta\phi(k)e^{\beta w_j^T\phi(k)}}{\left(e^{\beta w_j^T\phi(k)}+1\right)^2} \\ \vdots \\ \psi_{mj}\alpha\frac{2\beta\phi(k-1)e^{\beta w_j^T\phi(k-1)}}{\left(e^{\beta w_j^T\phi(k-1)}+1\right)^2} + d_{mj}\alpha\frac{2\beta\phi(k)e^{\beta w_j^T\phi(k)}}{\left(e^{\beta w_j^T\phi(k)}+1\right)^2} \end{bmatrix} \ldots -$$

$$2e_m(k)$$

$$\left(\psi_{mj}\alpha\frac{2\beta\phi(k-1)e^{\beta w_j^T\phi(k-1)}}{\left(e^{\beta w_j^T\phi(k-1)}+1\right)^2} + d_{mj}\alpha\frac{2\beta\phi(k)e^{\beta w_j^T\phi(k)}}{\left(e^{\beta w_j^T\phi(k)}+1\right)^2}\right).$$

Finally, the weight update equation for $j^{th}$ control signal $u_j(k)$ becomes:

$$w_j(k+1) = w_j(k) + \quad (11)$$

$$2\eta \sum_{l=1}^{m} e_l(k)\left(\psi_{lj}\alpha\frac{2\beta\phi(k-1)e^{\beta w_j^T\phi(k-1)}}{\left(e^{\beta w_j^T\phi(k-1)}+1\right)^2} + d_{lj}\alpha\frac{2\beta\phi(k)e^{\beta w_j^T\phi(k)}}{\left(e^{\beta w_j^T\phi(k)}+1\right)^2}\right).$$

where $e_l(k)$ corresponds to error at the $l^{th}$ output, $\psi_{lj}$ is the element at the $l^{th}$ row and $j^{th}$ column of the matrix $\Psi$, $\eta$ is the learning rate of the RBF neural network, $w_j$ is the vector for the weights of $j^{th}$ RBF output, m is the number of outputs of the process, and $\phi(k)$ is the basis function vector.

The derived control law can update the weights of RBF network 12 online, achieving satisfactory control results, provided that a sufficient number of neurons are initialized in the hidden layer. Therefore, in design, a suitable number of neurons can be chosen based on experience. Repeated simulations can then be run to test controller 10 with increased number of neurons each time until no appreciable increase in performance is noted.

Classical control techniques based on the inverse model require cancellation of the plant's poles and zeros, hence restricting the control problem to minimum phase plants only. This is because cancellation of an unstable zero of the process makes the controller unstable. In the present neural network-based controller 10, however, there is no such requirement, since the inverse of the plant is not obtained. Hence, the present controller 10 is good enough for systems having unstable zeros as well.

To illustrate the performance of the present robust controller for nonlinear MIMO systems 10, the following second-order discrete-time MIMO Hammerstein-type system is considered as an example.

$$x(k+1) = \begin{bmatrix} -0.10 & 0.30 \\ -0.50 & -0.45 \end{bmatrix}x(k) + \begin{bmatrix} 1.0 & -1.0 \\ 0.5 & 1.0 \end{bmatrix}v(k),$$

$$y(k) = \begin{bmatrix} 1 & 0 \\ 0 & 1 \end{bmatrix}x(k),$$

where the input $v(k)$ to the linear subsystem is a nonlinear function of the control signal $u(k)$ given by:

$$v_1(k) = u_1(k)u_2^2(k),$$

$$v_2(k) = \tan[u_2(k)].$$

Figure 3:
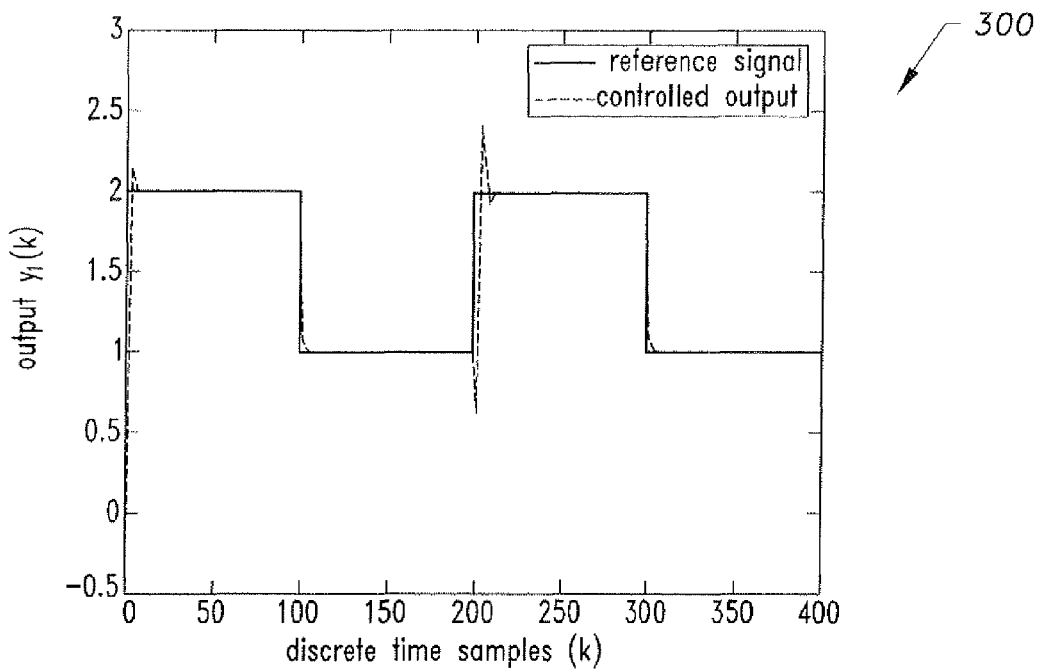
FIG. 3 is an output trajectory track for a first output of the robust controller according to the present invention in a minimum phase system.
Figure 4:
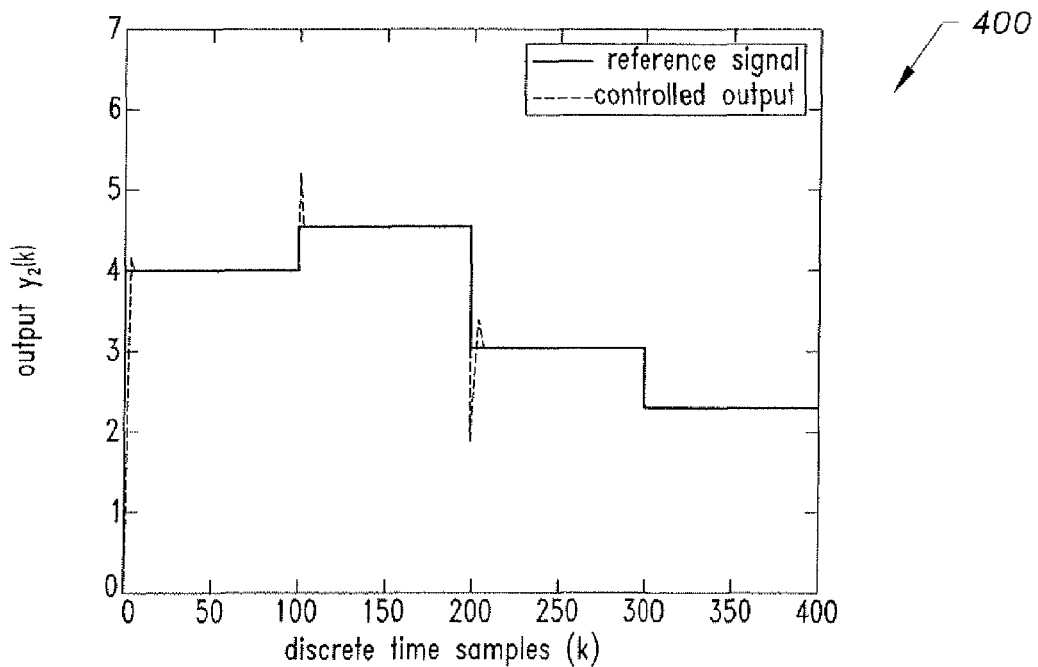
FIG. 4 is an output trajectory track for a second output of the robust controller according to the present invention in a minimum phase system.
Figure 5:
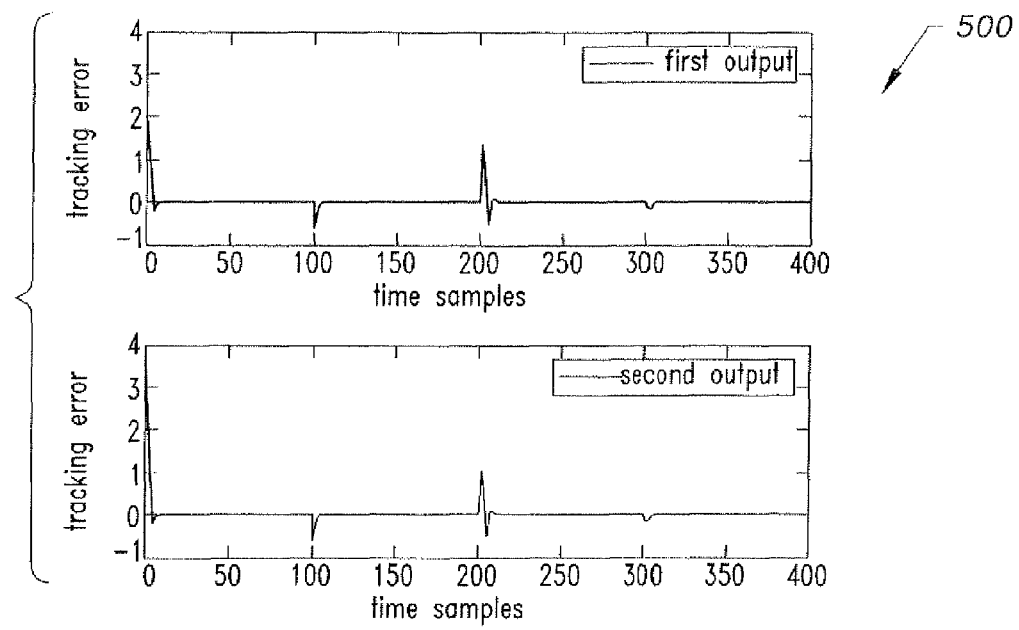
FIG. 5 is an output trajectory tracking error plot for the outputs of FIGS. 3 and 4.
Figure 6:
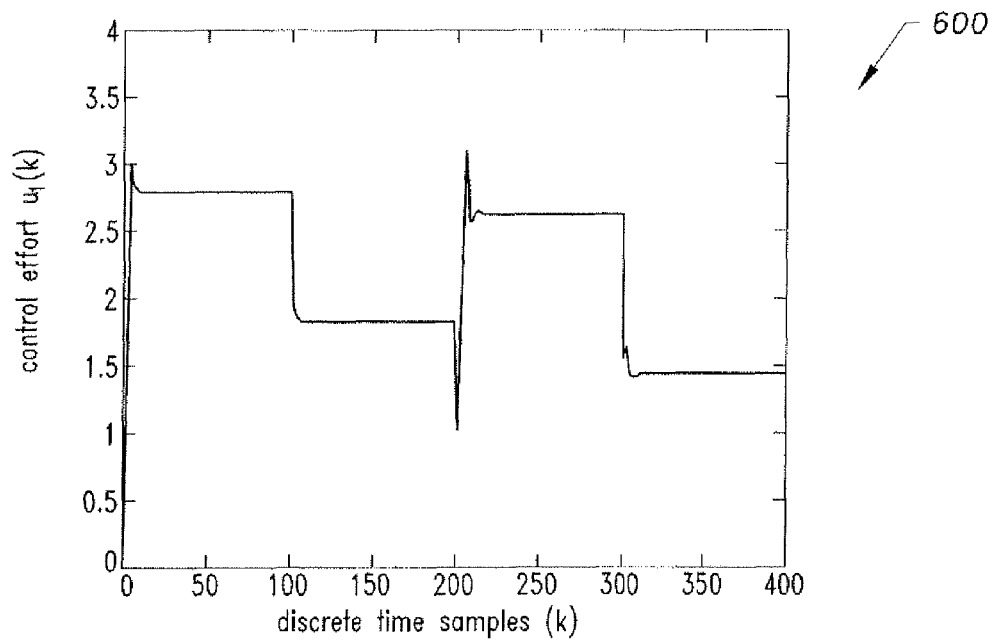
FIG. 6 is a plot of control effort $u_1(k)$ vs. discrete time samples (k) of the robust controller according to the present invention in a minimum phase system.
Figure 7:
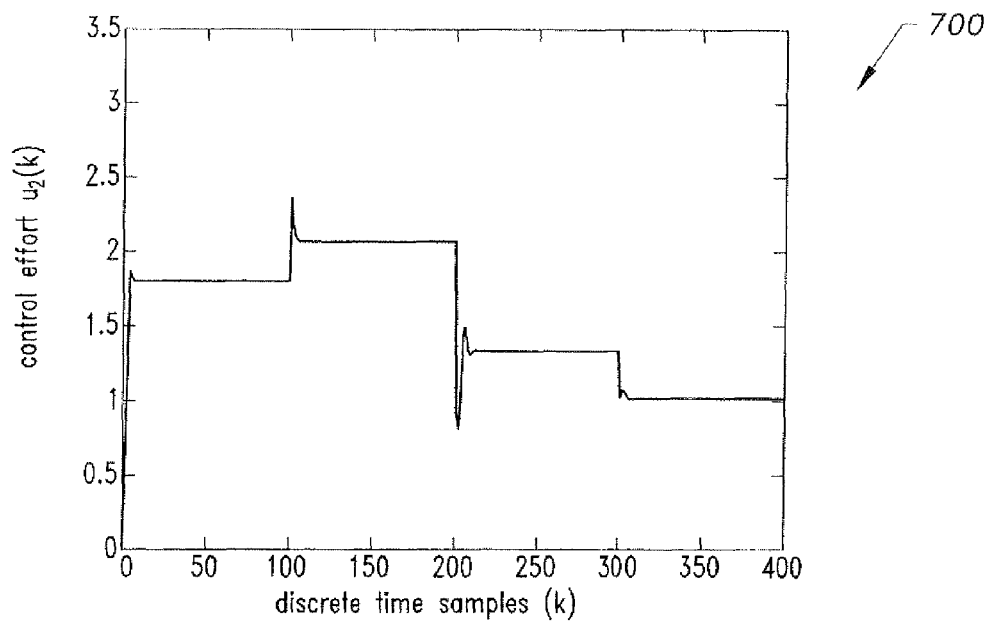
FIG. 7 is a plot of control effort $u_1(k)$ vs. discrete time samples (k) of the robust controller according to the present invention in a minimum phase system.

The linear part of the system has poles at $-0.275 \pm 0.345i$ for both the outputs. The zeros are at $-0.6, -0.15$ and $0.9, -0.6$ for the two outputs. Since all the zeros of the system are within the unit circle, the system represents a minimum-phase system with separate nonlinearities at the inputs. The control objective is to track independent trajectories of set points for the two outputs of the system. An RBF network of 5 neurons is initialized. Centers of the RBF network are chosen in the neighborhood of trajectory set-points. The controller shows good trajectory tracking results. Tracking results are shown in FIGS. 3, 4, and 5. Control efforts are shown in FIGS. 6 and 7.

Plot 300 of FIG. 3 shows different peaks of overshoot at k=100 and k=200, which seems odd at first glance. One reason for different peaks at these two instants is because of the nonlinearity at the plant input, which is lumped together for the two inputs, as given in equations (12) and (13). Hence, the effect of control signal $u_2(k)$ will be on both outputs $y_1(k)$ and $y_2(k)$. FIGS. 4, 5, 6, and 7 show plot 400, output trajectory tracking for minimum-phase system (second output $y_2(k)$), plot 500, output error for minimum-phase system, plot 600, control effort $u_1(k)$ for minimum-phase system, and plot 700, control effort $u_2(k)$ for minimum-phase system, respectively. As can be seen, the reference trajectory for the second output is not a periodic function. This causes different behavior of $y_1(k)$ at k=100 and k=200.

To test the performance of the controller on a non-minimum-phase system, the matrix A of the linear part in the first example is changed to $$A = \begin{bmatrix} 1.0 & 1.0 \\ -0.5 & -1.0 \end{bmatrix}.$$

The linear part of the system has poles at ±0.707 for both the outputs. The zeros are at −1.5, 0 and 2, 0.5 for the two outputs. As can be seen, one zero for both the outputs is outside the unit disc, hence making it a non-minimum-phase system. The control objective is to track independent trajectories of set points for the two outputs of the system. An RBF network of five neurons is initialized. Centers of the RBF network are chosen in a similar fashion as in the previous example.

Figure 8:
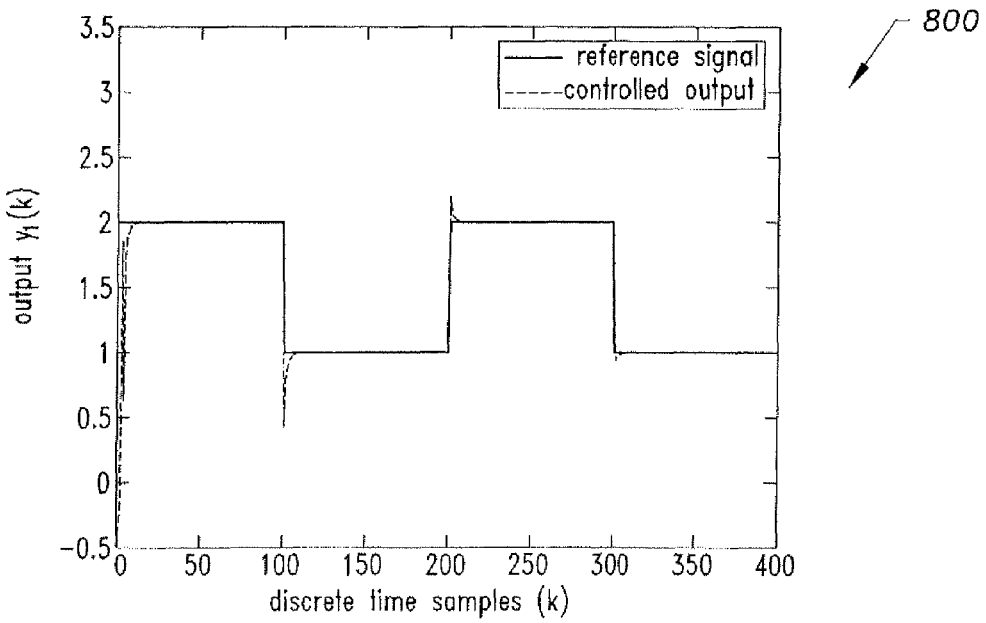
FIG. 8 is an output trajectory tracking plot for a first output of the robust controller according to the present invention in a non-minimum phase system.
Figure 9:
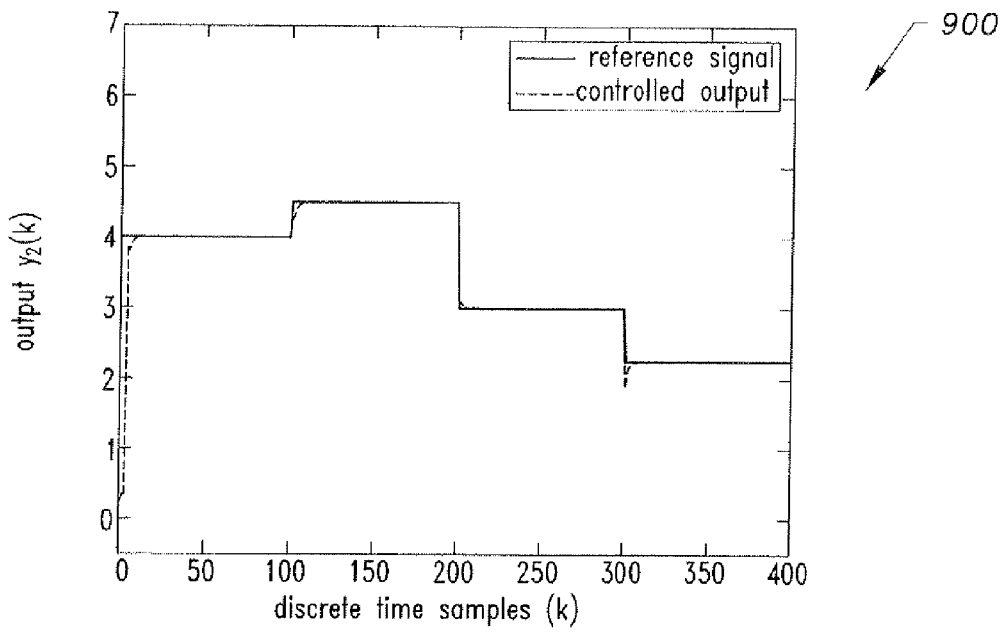
FIG. 9 is an output trajectory tracking plot for a second output of the robust controller according to the present invention in a non-minimum phase system.
Figure 10:
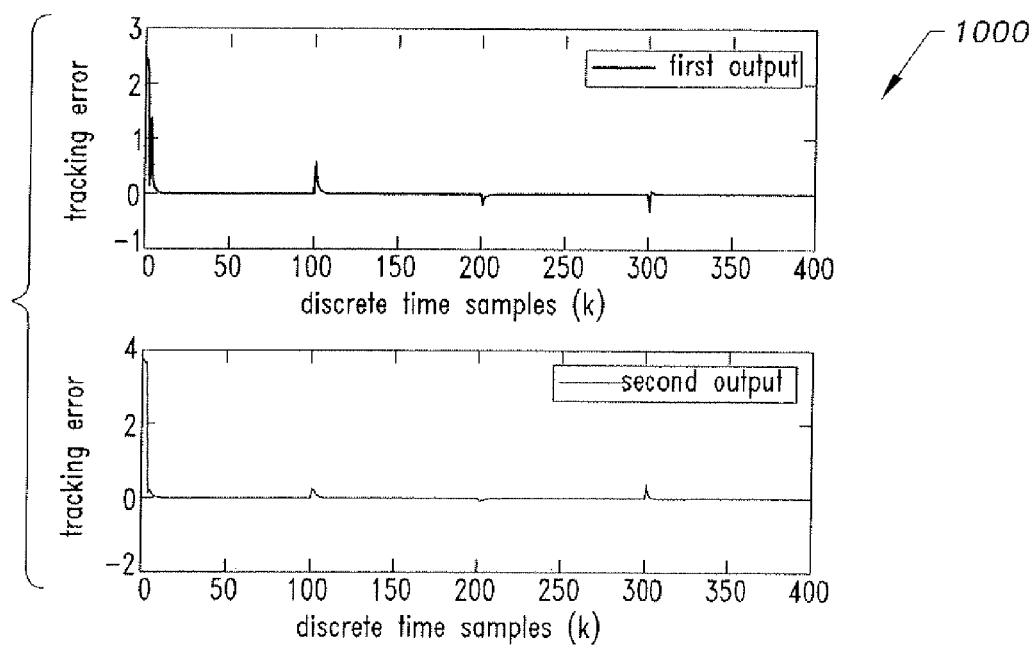
FIG. 10 is an output trajectory tracking error plot for the outputs of FIGS. 8 and 9.
Figure 11:
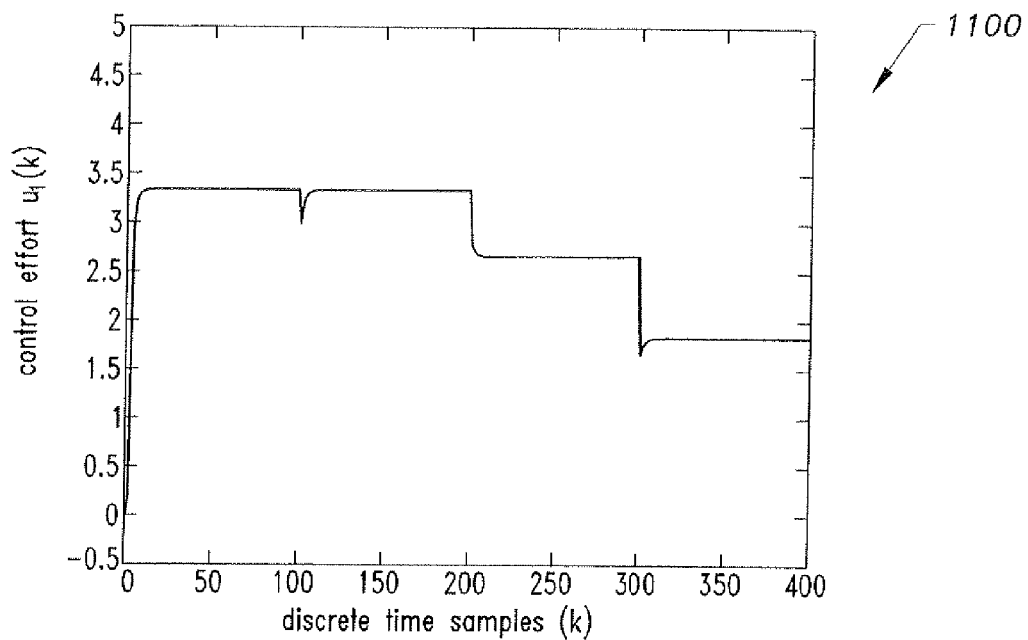
FIG. 11 is a plot of control effort $u_1(k)$ vs. discrete time samples (k) of the robust controller according to the present invention in a non-minimum phase system.
Figure 12:
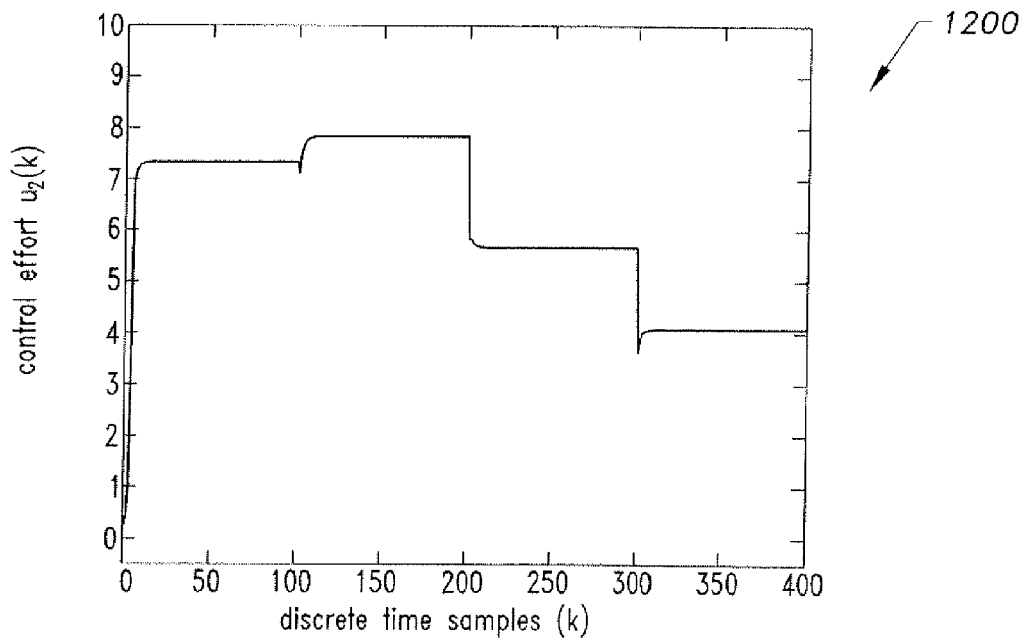
FIG. 12 is a plot of control effort $u_2(k)$ vs. discrete time samples (k) of the robust controller according to the present invention in a non-minimum phase system.

Plot 800 of FIG. 8 and plot 900 of FIG. 9 show output tracking of the system. Tracking error is shown in plot 1000 of FIG. 10, while control signals are shown in plots 1100 and 1200 of FIGS. 11 and 12, respectively. As seen from the Figures, the controller has damped the system sufficiently, and there are very small overshoots in the transient response.

To test the RBF-with-stabilizing-controller scheme, matrix A of the above example is changed such that the Eigenvalues of the discrete-time system lie outside the unit disc:

$$A = \begin{bmatrix} 1.3 & 0 \\ 0 & 0.98 \end{bmatrix}.$$

Figure 13:
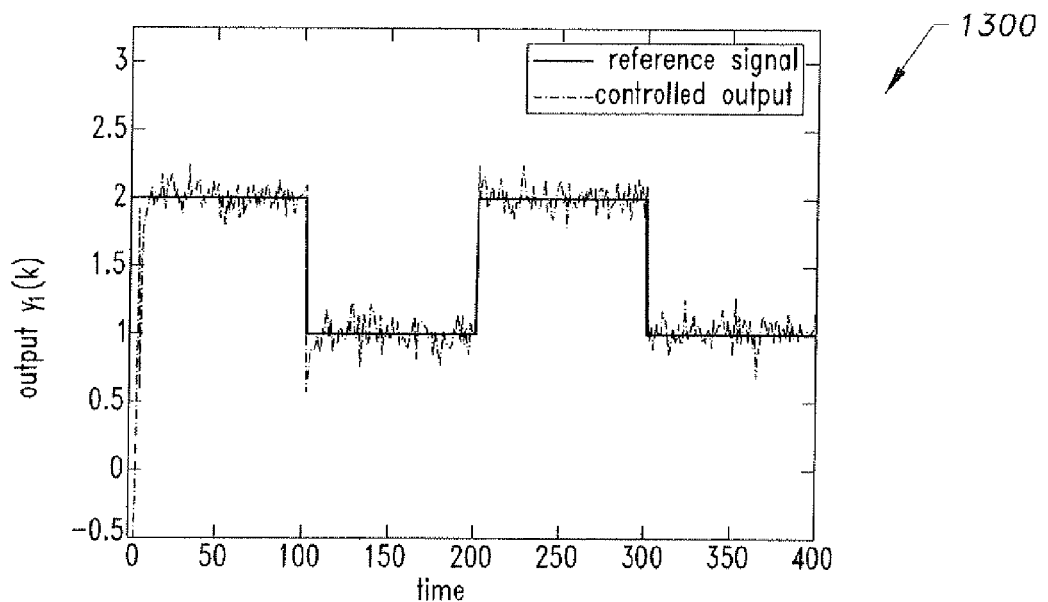
FIG. 13 is an output trajectory tracking plot for a first output $y_1(k)$ of the robust controller according to the present invention in a non-minimum phase system with additive noise on the output.
Figure 14:
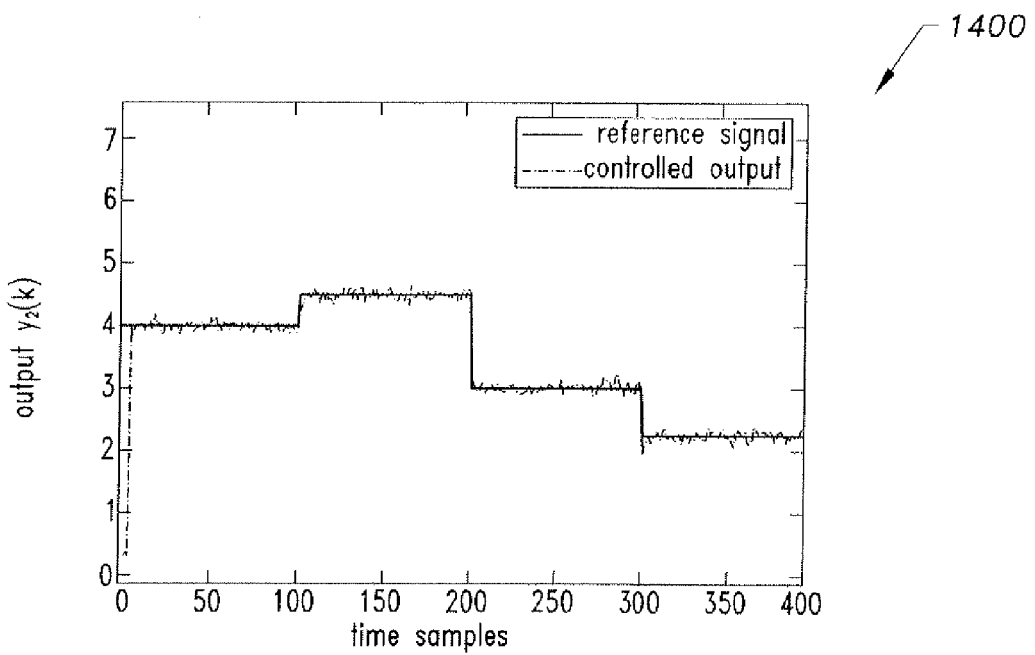
FIG. 14 is an output trajectory tracking plot for a second output $y_2(k)$ of the robust controller according to the present invention in a non-minimum phase system with additive noise on the output.
Figure 15:
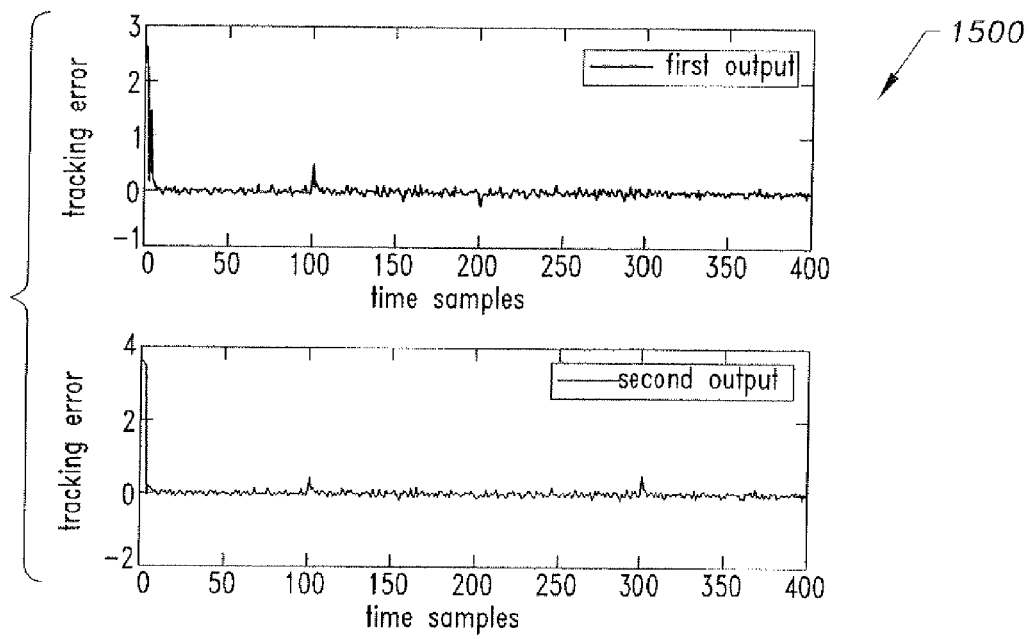
FIG. 15 is an output trajectory tracking error plot for the outputs of FIGS. 13 and 14.
Figure 16:
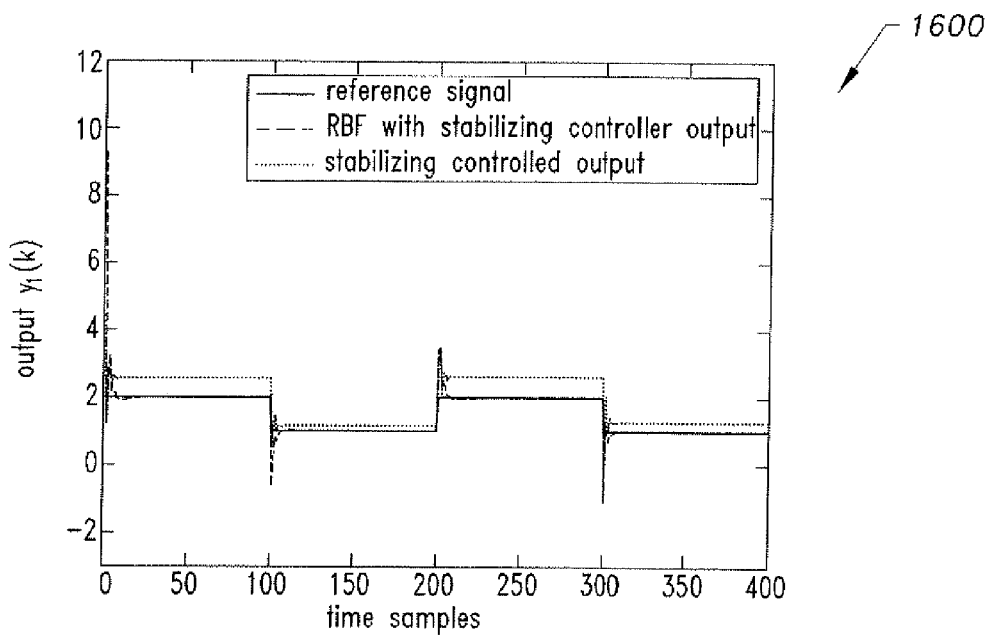
FIG. 16 is an output trajectory tracking plot for a first output $y_1(k)$ of the robust controller according to the present invention in an unstable system.
Figure 17:
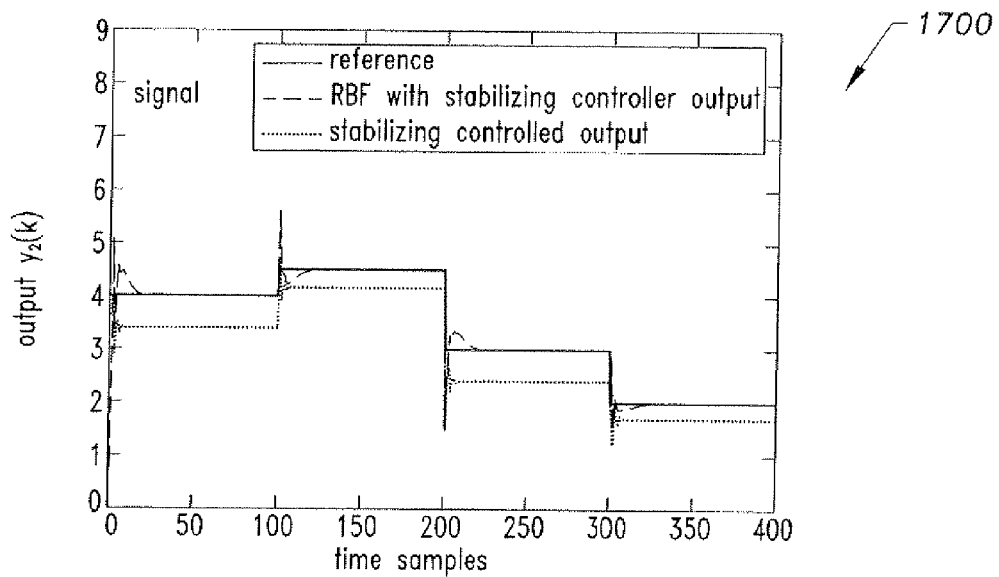
FIG. 17 is an output trajectory tracking plot for unstable system $y_2(k)$ of the robust controller according to the present invention in an unstable system.
Figure 18:
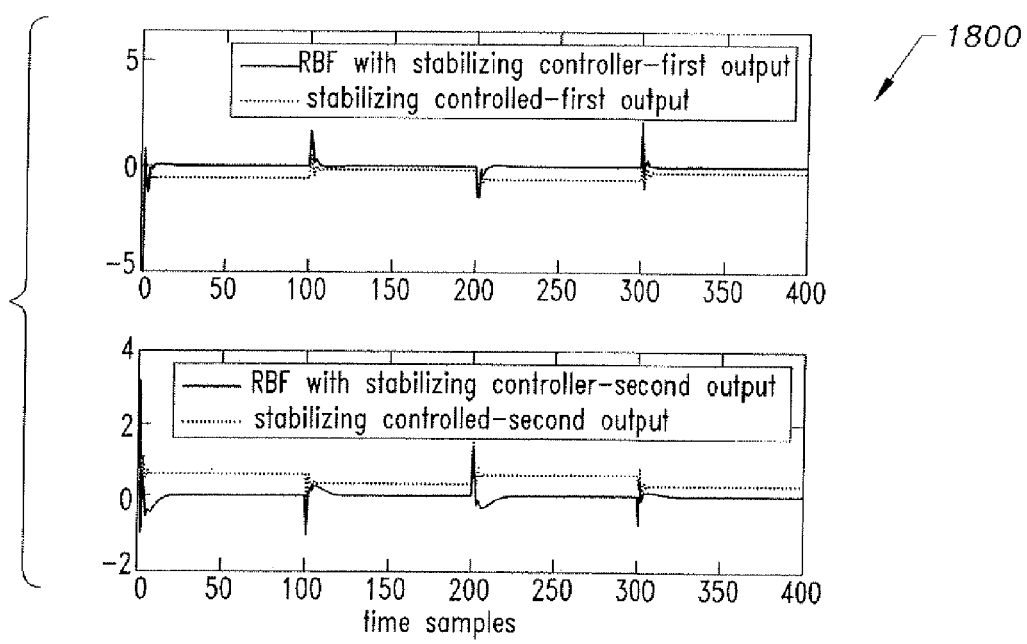
FIG. 18 is an output trajectory tracking error plot for the outputs of FIGS. 16 and 17.
Figure 19:
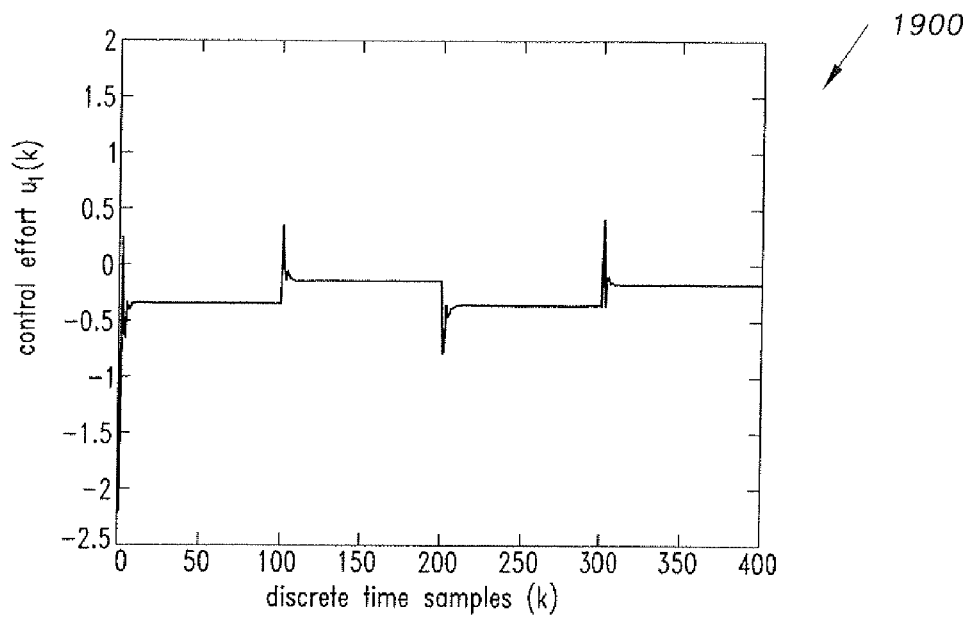
FIG. 19 is a plot of control effort $u_1(k)$ vs. discrete time samples (k) of the robust controller according to the present invention in an unstable system.

As can be seen, the Eigenvalues of the linear part lie at 1.3 and 0.98, making the system unstable. The stabilizing controller is a simple proportional controller with a small proportional gain of 0.3, and the RBF network is initialized with zero weights. The gain of the proportional controller is selected based on experience. It should be noted that the proportional controller gain is trivial here, since the RBF takes over the stabilizing controller in due course of time, after which the stabilizing controller becomes unimportant. Plots 1300 and 1400 of FIGS. 13 and 14, respectively, show the output tracking of the controller. Comparison with stabilizing-only-controller is also made, and the improved performance of the RBF-with-stabilizing-controller can be gauged from the comparison. Tracking errors for the two outputs are shown in plot 1500 of FIG. 15, while control efforts are shown in plots 1600 and 1700 of FIGS. 16 and 17, respectively. Plot 1800 of FIG. 18 and plot 1900 of FIG. 19 show the contribution of the RBF network 12 and the stabilizing controller 202 in generating the control signal. It can be seen that the output of the stabilizing controller 202 is substantial only at transitions, after which it quickly subsides to zero as the RBF network 12 takes over the responsibility.

It is noteworthy here that a system's response to impulse disturbances depends on various factors, such as closed-loop system bandwidth and system dynamics. An impulse in the time-domain is a white signal in the frequency-domain, consisting of all frequency components. Typically, most industrial processes behave as low-pass filters, thereby filtering out higher frequency components of a signal. The effect of impulse, therefore, remains limited to lower frequency components of the corrupted signals. Secondly, if the plant is a continuous-time system, a small sampling time needs to be chosen for discrete-control so that an impulse is not missed in-between samples.

Figure 20:
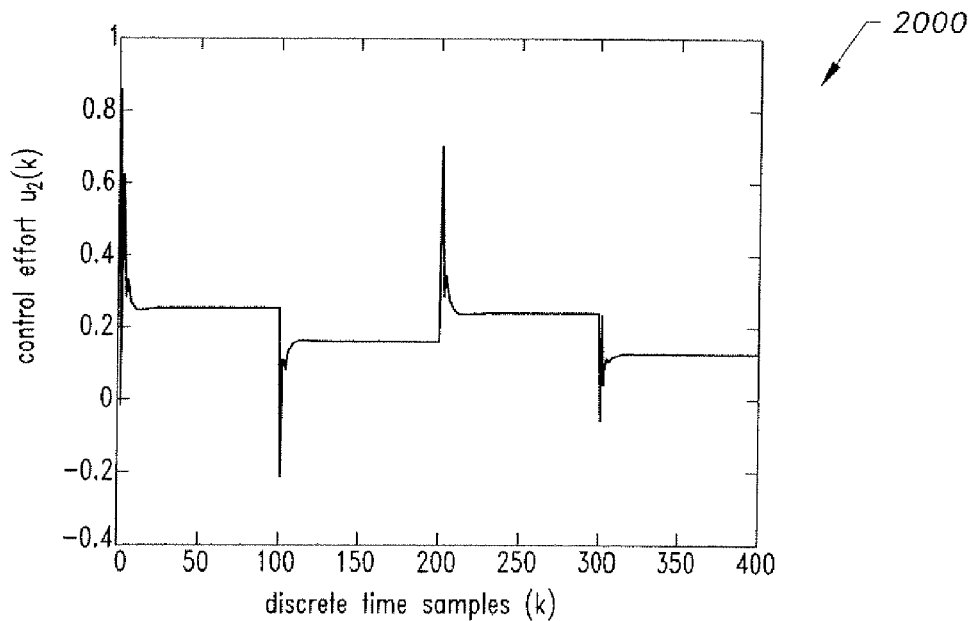
FIG. 20 is a plot of control effort $u_2(k)$ vs. discrete time samples (k) of the robust controller according to the present invention in an unstable system.
Figure 21:
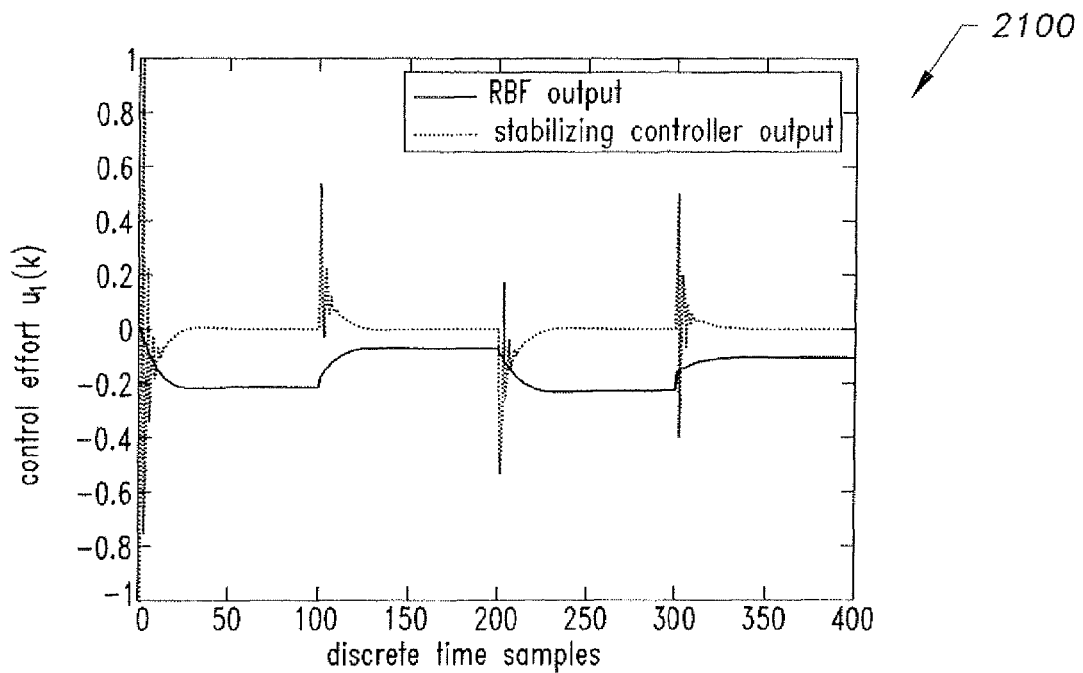
FIG. 21 is a plot showing the contribution of the radial basis function (RBF) and the stabilizing controller in generating control effort $u_1(k)$ vs. discrete time samples of the robust controller according to the present invention in an unstable system.
Figure 22:
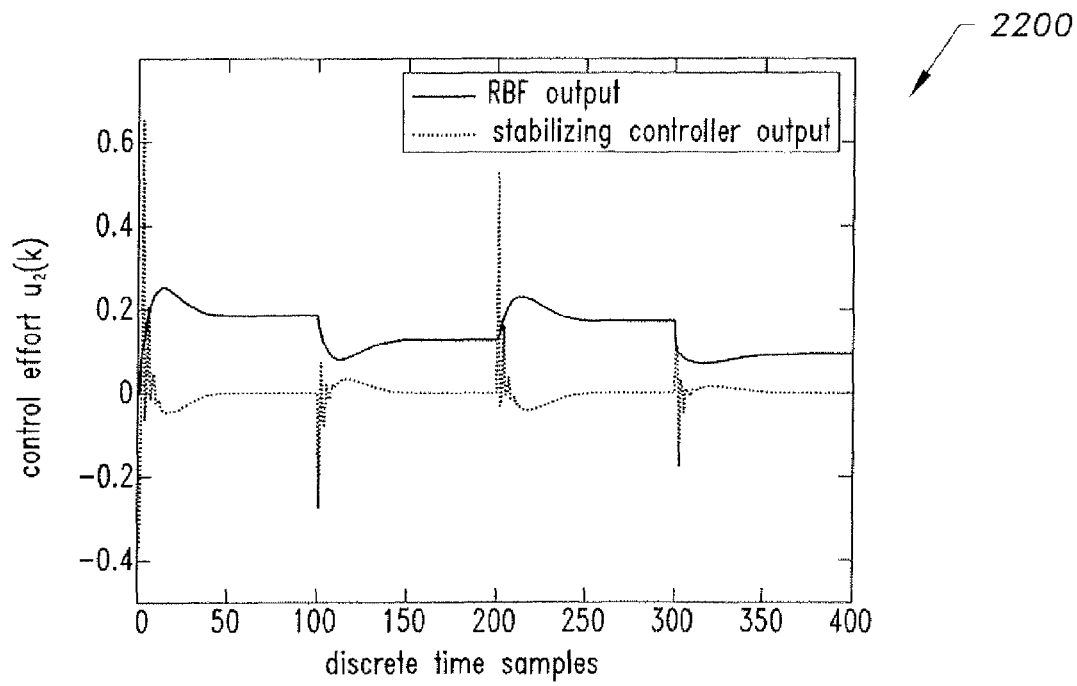
FIG. 22 is a plot showing the contribution of the radial basis function (RBF) and the stabilizing controller in generating control effort $u_2(k)$ vs. discrete time samples of the robust controller according to the present invention in an unstable system.
Figure 23:
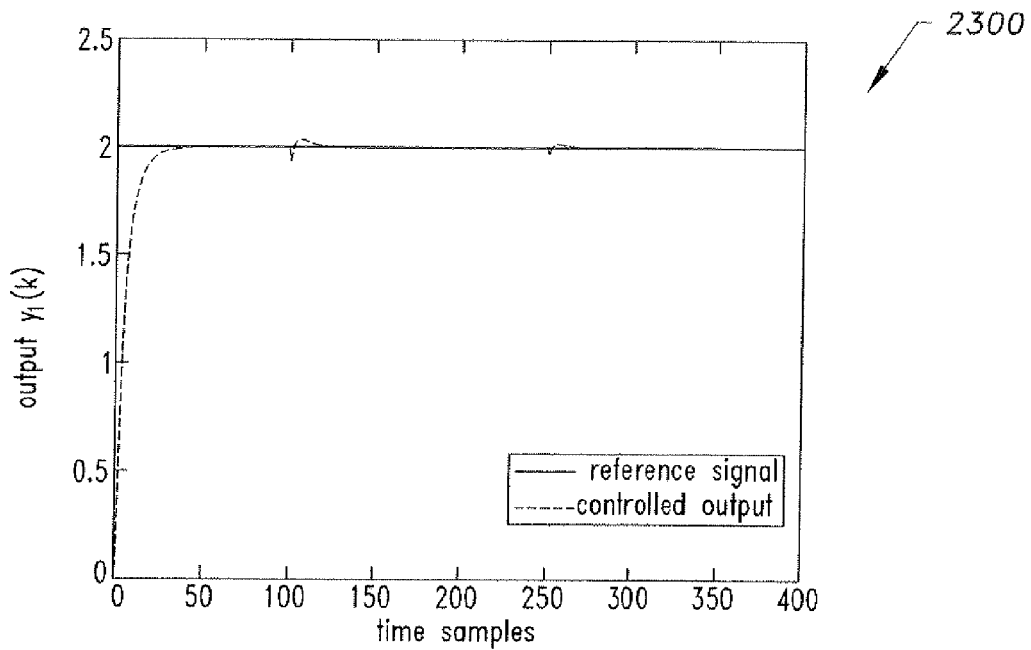
FIG. 23 is an output trajectory tracking plot of a first output $y_1(k)$ in a time-varying system.
Figure 24:
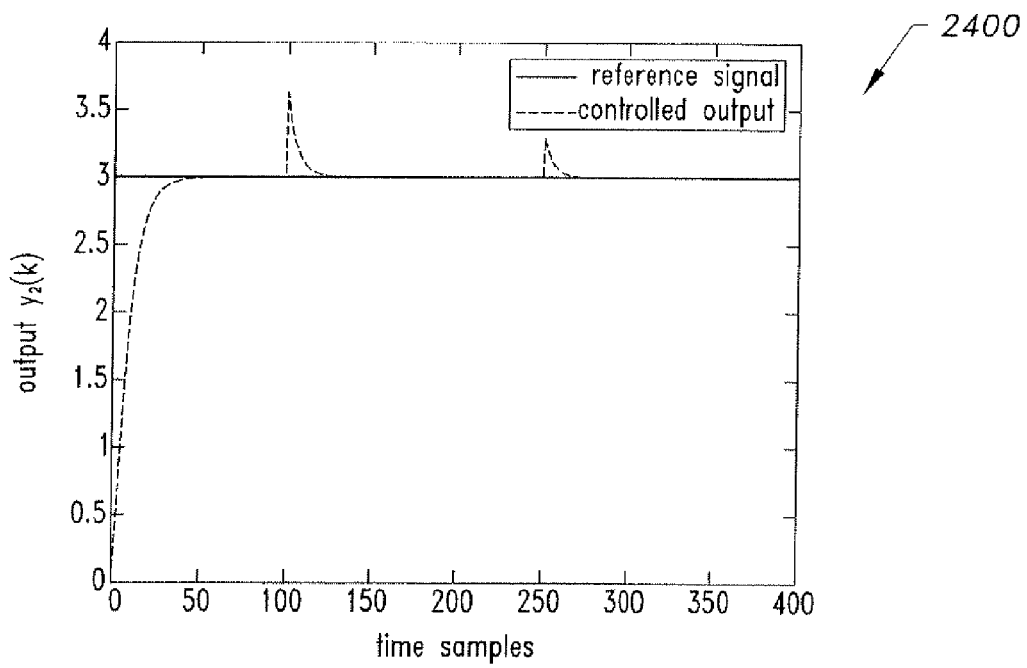
FIG. 24 is an output trajectory tracking plot of a second output $y_2(k)$ in a time-varying system.

For purposes of examining the response of the designed controller to impulse disturbance at the plant input, impulses are added at the input of the minimum-phase plant to corrupt the control signals. Impulses are added with magnitude equaling 20% of peak value of disturbance-free control signals $u_1(k)$ and $u_2(k)$ shown in FIGS. 6 and 7. Impulses are added at specific samples so that the response is properly recorded. Two impulses are added to $u_1(k)$ at discrete time samples k=100 and k=250, and two impulses are added to $u_2(k)$ at k=200 and k=225. The results are shown in plot 2000 of FIG. 20, plot 2100 of FIG. 21, plot 2200 of FIG. 22, plot 2300 of FIG. 23 and plot 2400 of FIG. 24, respectively. The results show quick stabilization of the system by the RBF controller 12 when the control signal is corrupted by high magnitude impulses.

The measure of robustness of a controller can be gauged from its performance when the system is subjected to a change in parameters. A robust controller will quickly adapt to changes in system parameters. To put the proposed controller to this test, a Hammerstein-type system of the minimum-phase example above is reconsidered. However, at discrete-time samples k=100 and k=250, a change of 40% and 30% is introduced in the parameters of A, respectively.

The controller proves to be robust enough to control the system without needing an update in the linearized estimate of the system required in Self Tuning Regulators (STR) and other adaptive controller.

To further impress the feasibility of the proposed control scheme, a real-life problem of Power System Engineering is taken as a case study, and the proposed controller is applied to solve that problem. The considered problem, known as the Automatic Generation Control (AGC) problem, has been an important subject for power engineers for quite some time. It is also known as Load Frequency Control (LFC) and has been under study for decades. The problem arises from the fact that loading in power systems is never constant, and changes in load induce changes in system frequency. This is because imbalance between real generated power and loading causes the generator shaft speed to change, resulting in the variation of system frequency.

Hence, a controller is needed to keep the frequency of the output electrical power at the nominal value. The input mechanical power to the generator is used to control the load frequency. The main quality risk involved during control is that control area frequencies can undergo prolonged fluctuations due to a sudden change of loading in an interconnected power system. These prolonged fluctuations are mainly the result of system nonlinearities. The purpose of AGC is to track load variations and reduce these fluctuations. In this way, the system frequency is maintained, transient errors are minimized and steady-state error is avoided.

Linear and nonlinear control of AGC systems is known by ordinary skilled artisans. AGC systems are modeled with nonlinearities, one of the main types of which is the Generation Rate Constraint. This is the constraint on the power generation rate of the turbine, and due to the Generation Rate Constraint; the disturbance in one area affects the output frequency in other interconnected areas.

Figure 25:
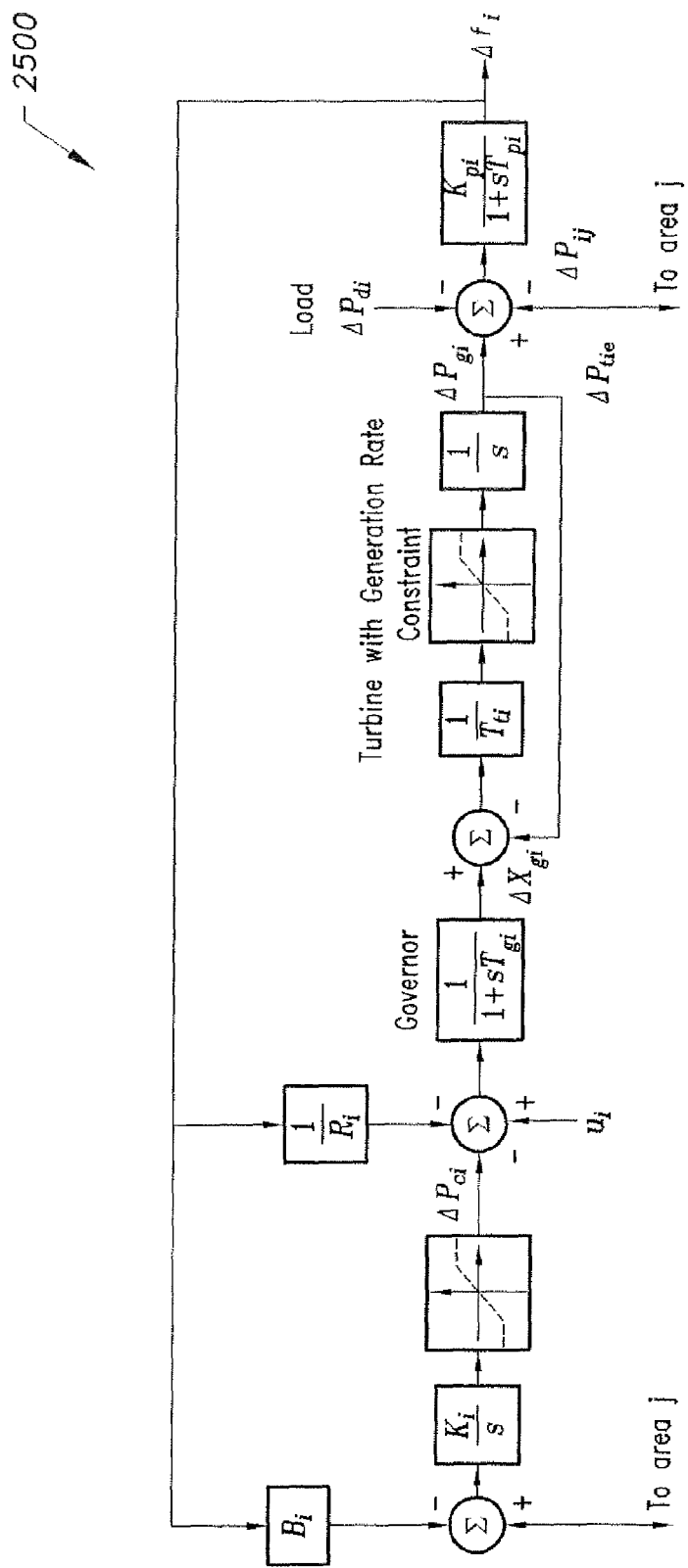
FIG. 25 is a block diagram of the $n^{th}$ area AGC with GRC nonlinearities.

The block diagram of an AGC system is given in FIG. 25 and the states of the system are:

$$\dot{X} = [\Delta \dot{f}_i(k) \Delta \dot{P}_{g_i}(k) \Delta \dot{X}_{g_i}(k) \Delta \dot{P}_{c_i}(k) \Delta \dot{P}_{t_i}(k)]^T \quad (12)$$

The definitions of the symbols used in the model are as follows:
$f_i$: area frequency in ith area (Hz).
$P_{gi}$: generator output for ith area (p.u. MW).
$X_{gi}$: governor valve position for ith area (p.u. MW).
$P_{ci}$: integral control value for ith area (p.u. MW).
$P_{ti}$: tie line power output for ith area (p.u. MW).
$P_{ti}$: load disturbance for ith area (p.u. MW).
$T_{gi}$: governor time constant for ith area (s).
$T_{pi}$: plant model time constant for ith area (s).
$T_{ti}$: turbine time constant for ith area (s).
$K_{pi}$: plant transfer function gain for $i^{th}$ area.
$R_i$: speed regulation due to governor action for ith area (Hz p.u. MW$^{-1}$).
$B_i$: frequency bias constant for ith area (p.u. MW Hz$^{-1}$).
$\alpha_{ij}$: ratio between the base values of areas i and j.

The model can be generally represented by the following equations:

$$\dot{X}_i(k) = A_i x_i(k) + B_i u_i(k) + \sum_{j=1, j \neq i}^{n} E_{ij} x_j(k) + F_i d_i(k), \quad (13)$$

$$y_i(k) = C_i(k) x_i(k), \quad (14)$$

where:

$$\dot{X} = \left[\Delta \dot{f}_i(k) \Delta_{P_{g_i}}(k) \Delta_{X_{g_i}}(k) \Delta_{P_{c_i}}(k) \Delta_{P_{t_i}}(k)\right]^T \quad (15)$$

$$A_i = \begin{bmatrix} \frac{-1}{T_{P_i}} & \frac{K_{P_i}}{T_{P_i}} & 0 & 0 & \frac{-K_{P_i}}{T_{P_i}} \\ 0 & \frac{-1}{T_{t_i}} & \frac{1}{T_{t_i}} & 0 & 0 \\ \frac{-1}{R_i T_{G_i}} & 0 & \frac{-1}{T_{G_i}} & \frac{-1}{T_{G_i}} & 0 \\ K_{E_i} & 0 & 0 & 0 & K_{E_i} \\ \sum_j T_{ij} & 0 & 0 & 0 & 0 \end{bmatrix}, \quad (16)$$

where $K_{E_i}$ is zero for a single area machine.

$$B_i^T = [0 \ 0 \ 1/T_{G_i} \ 0 \ 0], \quad (17)$$

$$E_{ij} = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ -T_{ij} & 0 & 0 & 0 & 0 \end{bmatrix}, \quad (18)$$

$$F_i^T = [-K_{P_i}/T_{P_i} \ 0 \ 0 \ 0 \ 0], \quad (19)$$

$$d_i(k) = P_{d_i}(k). \quad (20)$$

The numerical values of these parameters are computed using the following values.

$T_p=20$ s, $K_p=120$ Hz p.u. MW$^{-1}$, $T_t=0.3$ s, $T_g=0.08$ s, $R=2.4$ Hz p.u. MW$^{-1}$, $T_s=0.05$ s, where $T_s$ refers to discretization sampling time. The corresponding values of A, B & F are:

$$A = \begin{bmatrix} -0.05 & 6 & 0 & 0 \\ 0 & -3.33 & 3.33 & 0 \\ -5.208 & 0 & -12.5 & -12.5 \\ 0.6 & 0 & 0 & 0 \end{bmatrix}, \quad (21)$$

$$B = [0 \ 0 \ 12.5 \ 0]^T, \quad (22)$$

$$F = [-6 \ 0 \ 0 \ 0]^T. \quad (23)$$

The control objective of AGC is to keep the change in frequency, $\Delta f_i(k) = x_1(k)$ as close to 0 as possible in the presence of load disturbance, $d_i(k)$ by the manipulation of the input, $u_i(k)$.

Given a linear or nonlinear AGC system, the controller objective is to construct the ANN based controller such that it minimizes the error in the minimum time using minimum effort in the presence of disturbances and constraints.

The disturbance is applied as a p.u. load demand. Practically, this translates to a step load demand of a certain percentage from the AGC system. Naturally, this demand will cause the system to adjust its load by the same amount to fulfill the quality of service. This will change the load frequency. The proposed controller is required to minimize this frequency deviation and bring it to zero in minimum time while obeying the constraints on system states and control signal.

The nonlinearities in the system appear in the form of saturation on change of states $x_2$ and $x_4$. Mathematically, the nonlinearity can be described as $x_i(k-1) - GRC \le \Delta x_i(k) \le x_i(k-1) + GRC$, for $i = 2, 4$.

Figure 26:
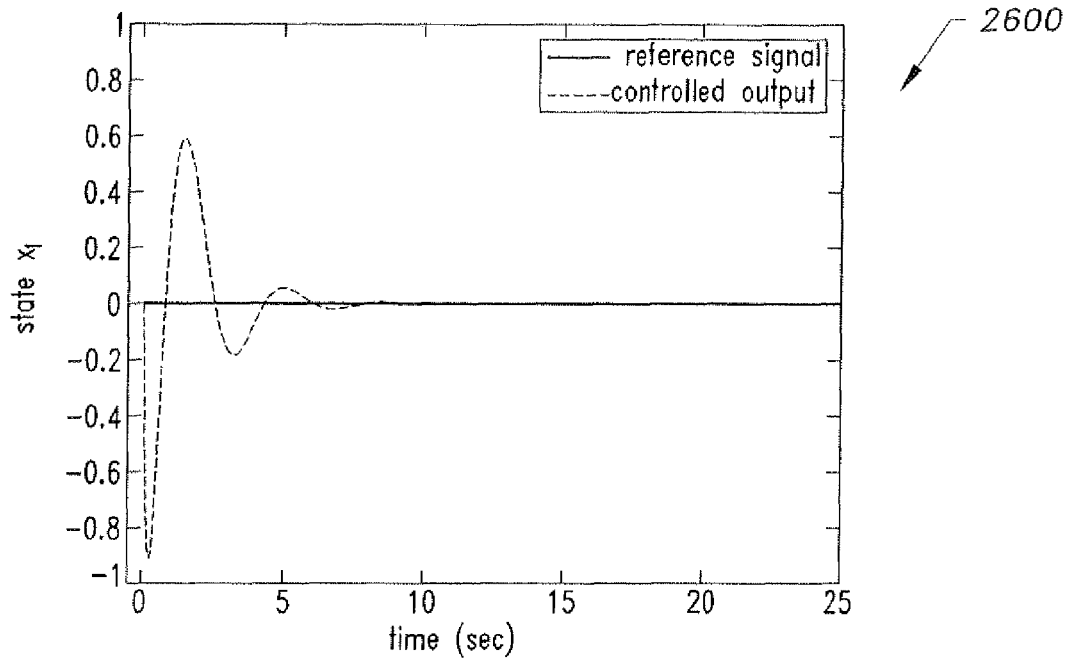
FIG. 26 is a frequency deviation plot for AGC with GRC nonlinearity.
Figure 27:
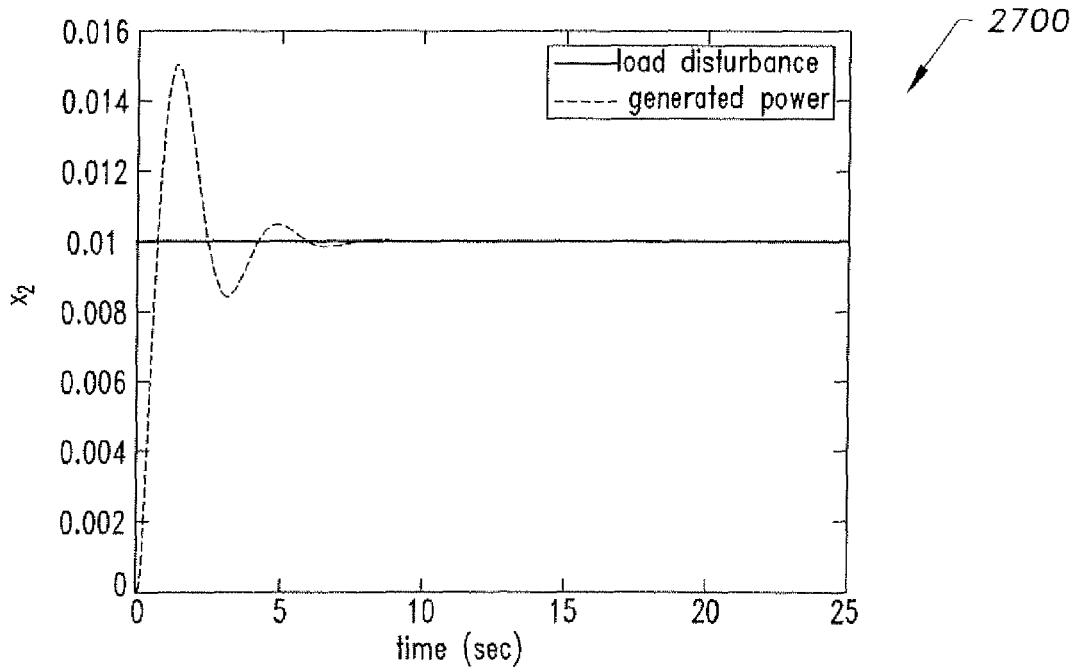
FIG. 27 is a plot showing changes in generated power for AGC with GRC nonlinearity.
Figure 28:
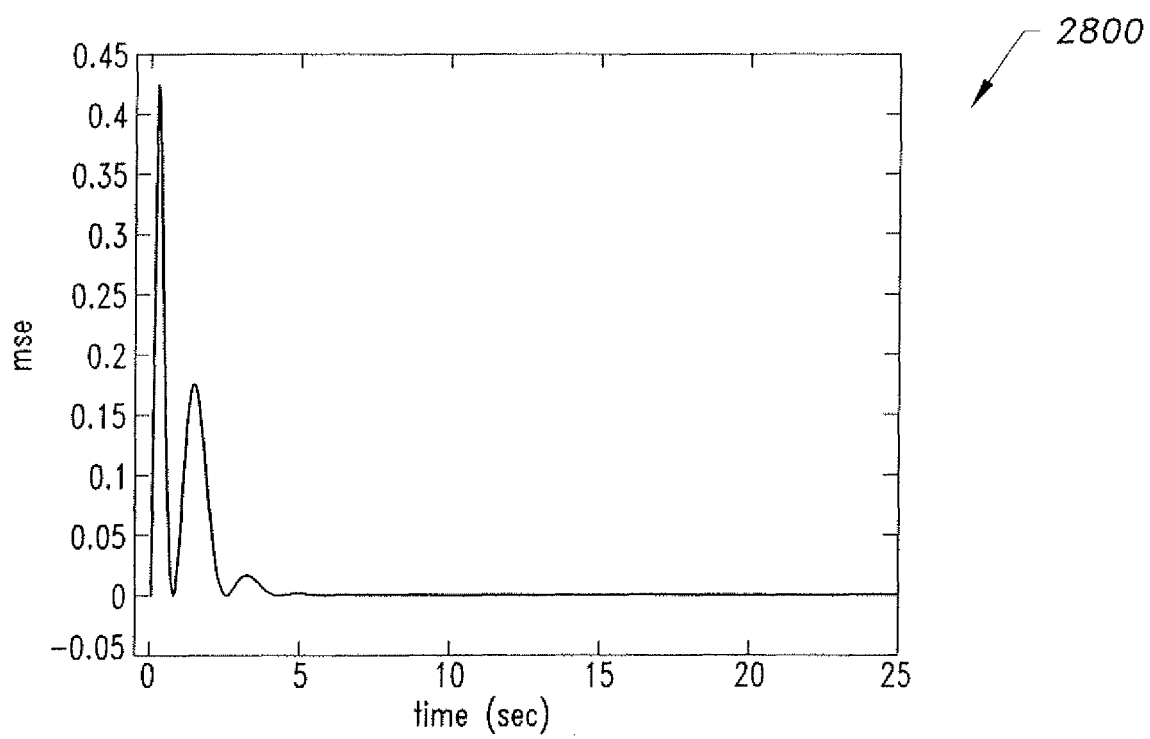
FIG. 28 is a plot showing convergence of the error function for AGC with GRC nonlinearity.

The system is tested for a practical GRC value of 0.6 p.u. MW min$^{-1}$=0.01 p.u. MW sec$^{-1}$, which is a usual practical case. This means that the generated power output of the system cannot vary by more than 0.01 p.u. MW in 1 second. A disturbance of 1% p.u. is present in the system. The proposed controller is applied to the system with this nonlinearity and the results can be seen in plots 2600, 2700, and 2800 of FIGS. 26, 27, and 28, respectively. The NN controller successfully keeps the frequency deviation to zero while the Generated power follows the step change in load demand disturbance. The settling time for the system output is well within practically tolerable range.

The proposed neural network controller provides satisfactory control for trajectory tracking of nonlinear MIMO systems and forces the outputs to converge to their respective reference trajectories. Control of unstable systems is ensured by using the proposed controller in combination with a simple stabilizing controller and making the RBF controller take over as training proceeds and stable RBF weights are obtained. The controller structure is very simple and updates itself online. The exact model of the plant need not be known and offline identification estimate is enough to drive the RBF network towards successful control. The restriction of non-minimum-phase systems is relaxed and the proposed controller does not face problems usually faced by classical inverse-model-based controllers. Most control techniques based on inverse model require cancellation of the plant's poles and zeros, hence restricting the control problem to minimum-phase plants only. This is because cancellation of an unstable zero of the process makes the controller difficult to handle. In the inventive neural network based controller 10 however, there is no such requirement since the controller is based on RBF network 12 that only estimates the plant zeros to design a controller. Control results with impulsive disturbances and controller response to changes in system parameters are also encouraging. Controller implementation to a practical power system control problem is seen to yield satisfactory results as well.

It is to be understood that the present invention is not limited to the embodiments described above, but encompasses any and all embodiments within the scope of the following claims.

We claim:

1. A robust controller for nonlinear MIMO systems, comprising:
   a radial basis function (RBF) neural network accepting reference trajectory inputs for a nonlinear process, the RBF neural network having an unconstrained output responsive to the nonlinear process control inputs;
   means for transforming the RBF output into constrained control outputs acceptable by the nonlinear process, the nonlinear process having inputs accepting the constrained control outputs from the transforming means;
   a summer accepting high fidelity and noisy outputs of the nonlinear process, the summer providing a computed sum of the high fidelity and noisy outputs of the nonlinear process;
   a difference calculator performing a difference calculation between the reference trajectory control inputs and the computed sum provided by the summer, a result of the difference calculation being provided by an output of the difference calculator, the difference calculator output representing an error of the nonlinear process output, the nonlinear process output error being characterized by an equation:

$$e(k) = [e_1(k) \ldots e_m(k)]^T;$$

an adaptation algorithm processor accepting the output of the difference calculator;
   a linear estimator outputting a linear estimation signal to the adaptation algorithm processor; and
   a weight updater accepting an output of the adaptation algorithm processor, the weight updater having a weight updater output connected to the RBF network for adjusting weights of the RBF network, the weight updater output being characterized by an equation, $$w_j(k+1) = w_j(k) + 2\eta \sum_{l=1}^{m} e_l(k) \left( \psi_{lj} \alpha \frac{2\beta\phi(k-1)e^{\beta w_j^T \phi(k-1)}}{\left(e^{\beta w_j^T \phi(k-1)} + 1\right)^2} + d_{lj} \alpha \frac{2\beta\phi(k)e^{\beta w_j^T \phi(k)}}{\left(e^{\beta w_j^T \phi(k)} + 1\right)^2} \right),$$

where $e_l(k)$ corresponds to error at the $l^{th}$ output, $\psi_{lj}$ is the element at the $l^{th}$ row and $j^{th}$ column of the matrix $\Psi$, $\eta$ is the learning rate of the RBF neural network, $w_j$ is the vector for the weights of $j^{th}$ RBF output, m is the number of outputs of the process, and $\phi(k)$ is the basis function vector, $\alpha$ is an upper and lower limit of a control signal constraint, and $\beta$ is a slope adjustment parameter of a linear part of the transforming means.

2. The robust controller for nonlinear MIMO systems according to claim 1, wherein said linear estimator includes an input accepting an output signal from the nonlinear process.

3. The robust controller for nonlinear MIMO systems according to claim 1, further comprising a stabilizing controller disposed in operable communication between said difference calculator and said adaptation algorithm processor;
   wherein said means for transforming includes a summing calculator disposed in operable communication between said stabilizing controller and the nonlinear process, the summing calculator accepting as operands an output of said stabilizing controller and the unconstrained output of said RBF neural network, a result computed by said summing calculator forming the constrained control output values fed to the nonlinear process.

4. The robust controller for nonlinear MIMO systems according to claim 1, wherein the nonlinear process is an automatic generation control process of a power distribution system.

5. The robust controller for nonlinear MIMO systems according to claim 1, further comprising means for training the weights of said RBF network in a negative direction of a derivative of a cost function I characterized by the equation: $I = e^T(k)e(k)$.

6. The robust controller for nonlinear MIMO systems according to claim 1, wherein said stabilizing controller is a proportional controller having a fixed gain.

7. The robust controller for nonlinear MIMO systems according to claim 4, further comprising means for computing an objective function, the objective function minimizing a change in frequency of the power distribution system under load disturbance conditions.

8. The robust controller for nonlinear MIMO systems according to claim 7, further comprising means for minimizing error in a minimum time using minimum effort in the presence of the load disturbance conditions.

9. The robust controller for nonlinear MIMO systems according to claim 8, wherein a generation rate constraint of the power distribution system is approximately 0.6 p.u MW min$^{-1}$=0.01 p.u MW sec$^{-1}$.

10. The robust controller for nonlinear MIMO systems according to claim 1, wherein said means for transforming includes an activation function generator connected to the unconstrained output of said RBF neural network, the activation function generator providing the constrained control outputs responsive to said RBF neural network unconstrained output.

11. The robust controller for nonlinear MIMO systems according to claim 10, wherein said activation function generator is a tangent-sigmoid activation function generator, thereby forming a constrained control signal at said activation function generator's control output.

* * * * *